(12) United States Patent
Mohinder

(10) Patent No.: US 8,341,627 B2
(45) Date of Patent: Dec. 25, 2012

(54) METHOD AND SYSTEM FOR PROVIDING USER SPACE ADDRESS PROTECTION FROM WRITABLE MEMORY AREA IN A VIRTUAL ENVIRONMENT

(75) Inventor: Preet Mohinder, New Delhi (IN)

(73) Assignee: McAfee, Inc., Santa Clara, CA (US)

( * ) Notice: Subject to any disclaimer, the term of this patent is extended or adjusted under 35 U.S.C. 154(b) by 441 days.

(21) Appl. No.: 12/545,745

(22) Filed: Aug. 21, 2009

(65) Prior Publication Data

US 2011/0047543 A1 Feb. 24, 2011

(51) Int. Cl.
*G06F 9/455* (2006.01)
*G06F 9/46* (2006.01)
*G06F 11/00* (2006.01)
*G06F 7/04* (2006.01)

(52) U.S. Cl. ............. 718/1; 718/100; 718/102; 726/22; 726/24; 726/27

(58) Field of Classification Search .................. None
See application file for complete search history.

(56) References Cited

U.S. PATENT DOCUMENTS

| | | |
|---|---|---|
| 4,688,169 A | 8/1987 | Joshi |
| 4,982,430 A | 1/1991 | Frezza et al. |
| 5,155,847 A | 10/1992 | Kirouac et al. |
| 5,222,134 A | 6/1993 | Waite et al. |
| 5,390,314 A | 2/1995 | Swanson |
| 5,521,849 A | 5/1996 | Adelson et al. |
| 5,560,008 A | 9/1996 | Johnson et al. |
| 5,699,513 A | 12/1997 | Feigen et al. |
| 5,778,349 A | 7/1998 | Okonogi |
| 5,787,427 A | 7/1998 | Benantar et al. |
| 5,842,017 A | 11/1998 | Hookway et al. |
| 5,907,709 A | 5/1999 | Cantey et al. |
| 5,974,149 A | 10/1999 | Leppek |

(Continued)

FOREIGN PATENT DOCUMENTS

EP 1 482 394 A2 12/2004

(Continued)

OTHER PUBLICATIONS

IA-32 Intel® Architecture Software Developer's Manual, vol. 3B; Jun. 2006; pp. 13, 15, 22, and 145-146.*

(Continued)

*Primary Examiner* — Meng An
*Assistant Examiner* — Bing Zhao
(74) *Attorney, Agent, or Firm* — Patent Capital Group

(57) ABSTRACT

A method in one example implementation includes identifying an address space in a memory element of a system configured to operate in a virtual environment. The address space includes at least one system address, and the address space is provided to a virtual machine monitor. The method also includes generating a page table entry for the system address in a shadow page table stored in the virtual machine monitor in response to a guest operating system initiating a process. The page table entry is marked as a page not being present in order to trigger a page fault for a system address access from the guest operating system. In more specific embodiments, the method may include evaluating a page fault to determine access to the address space, where access to a writeable area of the memory element is denied.

17 Claims, 3 Drawing Sheets

U.S. PATENT DOCUMENTS

| | | | |
|---|---|---|---|
| 5,987,611 | A | 11/1999 | Freund |
| 5,991,881 | A | 11/1999 | Conklin et al. |
| 6,141,698 | A | 10/2000 | Krishnan et al. |
| 6,192,401 | B1 | 2/2001 | Modiri et al. |
| 6,192,475 | B1 | 2/2001 | Wallace |
| 6,256,773 | B1 | 7/2001 | Bowman-Amuah |
| 6,275,938 | B1 | 8/2001 | Bond et al. |
| 6,338,149 | B1 | 1/2002 | Ciccone, Jr. et al. |
| 6,356,957 | B2 | 3/2002 | Sanchez, II et al. |
| 6,393,465 | B2 | 5/2002 | Leeds |
| 6,442,686 | B1 | 8/2002 | McArdle et al. |
| 6,449,040 | B1 | 9/2002 | Fujita |
| 6,453,468 | B1 | 9/2002 | D'Souza |
| 6,587,877 | B1 | 7/2003 | Douglis et al. |
| 6,662,219 | B1 | 12/2003 | Nishanov et al. |
| 6,748,534 | B1 | 6/2004 | Gryaznov et al. |
| 6,769,008 | B1 | 7/2004 | Kumar et al. |
| 6,769,115 | B1 | 7/2004 | Oldman |
| 6,795,966 | B1 | 9/2004 | Lim et al. |
| 6,832,227 | B2 | 12/2004 | Seki et al. |
| 6,834,301 | B1 | 12/2004 | Hanchett |
| 6,847,993 | B1 | 1/2005 | Novaes et al. |
| 6,907,600 | B2 * | 6/2005 | Neiger et al. ............... 717/139 |
| 6,918,110 | B2 | 7/2005 | Hundt et al. |
| 6,930,985 | B1 | 8/2005 | Rathi et al. |
| 6,934,755 | B1 | 8/2005 | Saulpaugh et al. |
| 6,988,101 | B2 | 1/2006 | Ham et al. |
| 6,988,124 | B2 | 1/2006 | Douceur et al. |
| 7,010,796 | B1 | 3/2006 | Strom et al. |
| 7,024,548 | B1 | 4/2006 | O'Toole, Jr. |
| 7,039,949 | B2 | 5/2006 | Cartmell et al. |
| 7,065,767 | B2 | 6/2006 | Kambhammettu et al. |
| 7,069,330 | B1 | 6/2006 | McArdle et al. |
| 7,082,456 | B2 | 7/2006 | Mani-Meitav et al. |
| 7,093,239 | B1 | 8/2006 | van der Made |
| 7,124,409 | B2 | 10/2006 | Davis et al. |
| 7,139,916 | B2 | 11/2006 | Billingsley et al. |
| 7,152,148 | B2 | 12/2006 | Williams et al. |
| 7,159,036 | B2 | 1/2007 | Hinchliffe et al. |
| 7,177,267 | B2 | 2/2007 | Oliver et al. |
| 7,203,864 | B2 | 4/2007 | Goin et al. |
| 7,251,655 | B2 | 7/2007 | Kaler et al. |
| 7,290,266 | B2 | 10/2007 | Gladstone et al. |
| 7,302,558 | B2 | 11/2007 | Campbell et al. |
| 7,330,849 | B2 | 2/2008 | Gerasoulis et al. |
| 7,346,781 | B2 | 3/2008 | Cowie et al. |
| 7,350,204 | B2 | 3/2008 | Lambert et al. |
| 7,353,501 | B2 | 4/2008 | Tang et al. |
| 7,363,022 | B2 | 4/2008 | Whelan et al. |
| 7,370,360 | B2 | 5/2008 | van der Made |
| 7,406,517 | B2 | 7/2008 | Hunt et al. |
| 7,441,265 | B2 | 10/2008 | Staamann et al. |
| 7,464,408 | B1 | 12/2008 | Shah et al. |
| 7,506,170 | B2 | 3/2009 | Finnegan |
| 7,546,333 | B2 | 6/2009 | Alon et al. |
| 7,607,170 | B2 | 10/2009 | Chesla |
| 7,657,599 | B2 | 2/2010 | Smith |
| 7,685,635 | B2 | 3/2010 | Vega et al. |
| 7,698,744 | B2 | 4/2010 | Fanton et al. |
| 7,757,269 | B1 | 7/2010 | Roy-Chowdhury et al. |
| 7,809,704 | B2 | 10/2010 | Surendran et al. |
| 7,836,504 | B2 | 11/2010 | Ray et al. |
| 7,908,653 | B2 | 3/2011 | Brickell et al. |
| 7,937,455 | B2 | 5/2011 | Saha et al. |
| 8,015,563 | B2 | 9/2011 | Araujo et al. |
| 2002/0069367 | A1 | 6/2002 | Tindal et al. |
| 2002/0083175 | A1 | 6/2002 | Afek et al. |
| 2002/0099671 | A1 | 7/2002 | Mastin Crosbie et al. |
| 2003/0014667 | A1 | 1/2003 | Kolitchtchak |
| 2003/0023736 | A1 | 1/2003 | Abkemeier |
| 2003/0033510 | A1 | 2/2003 | Dice |
| 2003/0073894 | A1 | 4/2003 | Chiang et al. |
| 2003/0074552 | A1 | 4/2003 | Olkin et al. |
| 2003/0120601 | A1 | 6/2003 | Ouye et al. |
| 2003/0120811 | A1 | 6/2003 | Hanson et al. |
| 2003/0120935 | A1 | 6/2003 | Teal et al. |
| 2003/0145232 | A1 | 7/2003 | Poletto et al. |
| 2003/0163718 | A1 | 8/2003 | Johnson et al. |
| 2003/0167399 | A1 | 9/2003 | Audebert et al. |
| 2004/0003258 | A1 | 1/2004 | Billingsley et al. |
| 2004/0015554 | A1 | 1/2004 | Wilson |
| 2004/0051736 | A1 | 3/2004 | Daniell |
| 2004/0054928 | A1 | 3/2004 | Hall |
| 2004/0143749 | A1 | 7/2004 | Tajalli et al. |
| 2004/0167906 | A1 | 8/2004 | Smith et al. |
| 2004/0230963 | A1 | 11/2004 | Rothman et al. |
| 2004/0243678 | A1 | 12/2004 | Smith et al. |
| 2004/0255161 | A1 | 12/2004 | Cavanaugh |
| 2005/0018651 | A1 | 1/2005 | Yan et al. |
| 2005/0108562 | A1 | 5/2005 | Khazan et al. |
| 2005/0114672 | A1 | 5/2005 | Duncan et al. |
| 2005/0228990 | A1 | 10/2005 | Kato et al. |
| 2005/0235360 | A1 | 10/2005 | Pearson |
| 2005/0257207 | A1 | 11/2005 | Blumfield et al. |
| 2005/0260996 | A1 | 11/2005 | Groenendaal |
| 2005/0262558 | A1 | 11/2005 | Usov |
| 2005/0273858 | A1 | 12/2005 | Zadok et al. |
| 2005/0283823 | A1 | 12/2005 | Okajo et al. |
| 2006/0004875 | A1 | 1/2006 | Baron et al. |
| 2006/0015501 | A1 | 1/2006 | Sanamrad et al. |
| 2006/0037016 | A1 | 2/2006 | Saha et al. |
| 2006/0080656 | A1 | 4/2006 | Cain et al. |
| 2006/0085785 | A1 | 4/2006 | Garrett |
| 2006/0101277 | A1 | 5/2006 | Meenan et al. |
| 2006/0133223 | A1 | 6/2006 | Nakamura et al. |
| 2006/0136910 | A1 | 6/2006 | Brickell et al. |
| 2006/0136911 | A1 | 6/2006 | Robinson et al. |
| 2006/0195906 | A1 | 8/2006 | Jin et al. |
| 2006/0236398 | A1 | 10/2006 | Trakic et al. |
| 2007/0011746 | A1 | 1/2007 | Malpani et al. |
| 2007/0039049 | A1 | 2/2007 | Kupferman et al. |
| 2007/0050764 | A1 | 3/2007 | Traut |
| 2007/0074199 | A1 | 3/2007 | Schoenberg |
| 2007/0083522 | A1 | 4/2007 | Nord et al. |
| 2007/0101435 | A1 | 5/2007 | Konanka et al. |
| 2007/0136579 | A1 | 6/2007 | Levy et al. |
| 2007/0169079 | A1 | 7/2007 | Keller et al. |
| 2007/0192329 | A1 | 8/2007 | Croft et al. |
| 2007/0253430 | A1 | 11/2007 | Minami et al. |
| 2007/0271561 | A1 | 11/2007 | Winner et al. |
| 2008/0005737 | A1 | 1/2008 | Saha et al. |
| 2008/0005798 | A1 | 1/2008 | Ross |
| 2008/0010304 | A1 | 1/2008 | Vempala et al. |
| 2008/0052468 | A1 | 2/2008 | Speirs et al. |
| 2008/0082977 | A1 | 4/2008 | Araujo et al. |
| 2008/0120499 | A1 | 5/2008 | Zimmer et al. |
| 2008/0163207 | A1 | 7/2008 | Reumann et al. |
| 2008/0163210 | A1 | 7/2008 | Bowman et al. |
| 2008/0184373 | A1 | 7/2008 | Traut et al. |
| 2008/0294703 | A1 | 11/2008 | Craft et al. |
| 2008/0301770 | A1 | 12/2008 | Kinder |
| 2009/0038017 | A1 * | 2/2009 | Durham et al. ............... 726/27 |
| 2009/0043993 | A1 | 2/2009 | Ford et al. |
| 2009/0144300 | A1 | 6/2009 | Chatley et al. |
| 2009/0150639 | A1 | 6/2009 | Ohata |
| 2009/0249438 | A1 | 10/2009 | Litvin et al. |
| 2010/0071035 | A1 | 3/2010 | Budko et al. |
| 2010/0100970 | A1 | 4/2010 | Chowdhury et al. |
| 2010/0114825 | A1 | 5/2010 | Siddegowda |
| 2010/0281133 | A1 | 11/2010 | Brendel |
| 2010/0293225 | A1 | 11/2010 | Sebes et al. |
| 2011/0035423 | A1 | 2/2011 | Kobayashi et al. |
| 2011/0077948 | A1 | 3/2011 | Sharma et al. |
| 2011/0093842 | A1 | 4/2011 | Sebes |
| 2011/0093950 | A1 | 4/2011 | Bhargava et al. |
| 2011/0119760 | A1 | 5/2011 | Sebes et al. |
| 2011/0138461 | A1 | 6/2011 | Bhargava et al. |
| 2012/0030731 | A1 | 2/2012 | Bhargava et al. |
| 2012/0030750 | A1 | 2/2012 | Bhargava et al. |

FOREIGN PATENT DOCUMENTS

| | | |
|---|---|---|
| EP | 2 037 657 A1 | 3/2009 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |

| | | |
|---|---|---|
| WO | WO 2011/059877 | 5/2011 |
| WO | WO 2012/015485 | 2/2012 |
| WO | WO 2012/015489 | 2/2012 |

OTHER PUBLICATIONS

Sailer et al.; sHype: Secure Hypervisor Approach to Trusted Virtualized Systems, IBM research Report Feb. 2, 2005.*

Eli M. Dow, et al., "The Xen Hypervisor," INFORMIT, dated Apr. 10, 2008, informit.com/articles/printerfriendly.aspx?p=1187966, printed Aug. 11, 2009 (13 pages).

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: vmware.com/solutions/desktop/, printed Oct. 12, 2009, 1 page.

Secure Mobile Computing, Website: vmware.com/solutions/desktop/mobile.html, printed Oct. 12, 2009, 2 pages.

U.S. Appl. No. 12/636,414, entitled "System and Method for Managing Virtual Machine Configurations," filed Dec. 11, 2009, Inventor(s): Harvinder Singh Sawhney, et al.

Kurt Gutzmann, "Access Control and Session Management in the HTTP Environment," Jan./Feb. 2001, pp. 26-35, IEEE Internet Computing.

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Lanugage Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/545,609, entitled "System and Method for Enforcing Security Policies in a Virtual Environment," filed Aug. 21, 2009, Inventor(s): Amit Dang, et al.

U.S. Appl. No. 12/551,673, entitled "Piracy Prevention Using Unique Module Translation," filed Sep. 1, 2009, Inventor(s): E. John Sebes et al.

Barrantes et al., "Randomized Instruction Set Emulation to Dispurt Binary Code Injection Attacks," Oct. 27-31, 2003, ACM, pp. 281-289.

Check Point Software Technologies Ltd.: "ZoneAlarm Security Software User Guide Version 9", Aug. 24, 2009, XP002634548, 259 pages, retrieved from Internet: URL: download.zonealarm.com/bin/media/pdf/zaclient91_user_manual.pdf.

Gaurav et al., "Countering Code-Injection Attacks with Instruction-Set Randomization," Oct. 27-31, 2003, ACM, pp. 272-280.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.

Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Tal Garfinkel, et al., "Terra: A Virtual Machine-Based Platform for Trusted Computing," XP-002340992, SOSP'03, Oct. 19-22, 2003, 14 pages.

U.S. Appl. No. 12/880,125, entitled "System and Method for Clustering Host Inventories," filed Sep. 12, 2010, Inventor(s) Rishi Bhargava, et al.

U.S. Appl. No. 12/903,993, entitled "Method and System for Containment of Usage of Language Interfaces," filed Oct. 13, 2010, Inventor(s) Rosen Sharma, et al.

U.S. Appl. No. 12/946,344, entitled "Method and System for Containment of Usage of Language Interfaces," filed Nov. 15, 2010, Inventor(s) Rosen Sharma, et al.

U.S. Appl. No. 13/012,138, entitled "System and Method for Selectively Grouping and Managing Program Files," filed Jan. 24, 2011, Inventor(s) Rishi Bhargava, et al.

U.S. Appl. No. 13/037,988, entitled "System and Method for Botnet Detection by Comprehensive Email Behavioral Analysis," filed Mar. 1, 2011, Inventor(s) Sven Krasser, et al.

Notification of International Preliminary Report on Patentability and Written Opinion mailed May 24, 2012 for International Application No. PCT/US2010/055520, 5 pages.

U.S. Appl. No. 13/558,181, entitled "Method and Apparatus for Process Enforced Configuration Management," filed Jul. 25, 2012, Inventor(s) Rishi Bhargava et al.

U.S. Appl. No. 13/558,227, entitled "Method and Apparatus for Process Enforced Configuration Management," filed Jul. 25, 2012, Inventor(s) Rishi Bhargava et al.

U.S. Appl. No. 13/558,277, entitled "Method and Apparatus for Process Enforced Configuration Management," filed Jul. 25, 2012, Inventor(s) Rishi Bhargava et al.

Eli M. Dow, et al., "The Xen Hypervisor," INFORMIT, dated Apr. 10, 2008, www.informit.com/articles/printerfriendly.aspx?p=1187966, printed Aug. 11, 2009 (13 pages).

"Xen Architecture Overview," Xen, dated Feb. 13, 2008, Version 1.2, wiki.xensource.com/xenwiki/XenArchitecture?action=AttachFile&do=get&target=Xen+Architecture_Q1+2008.pdf, printed Aug. 18, 2009 (9 pages).

* cited by examiner

METHOD AND SYSTEM FOR PROVIDING USER SPACE ADDRESS PROTECTION FROM WRITABLE MEMORY AREA IN A VIRTUAL ENVIRONMENT

TECHNICAL FIELD

This disclosure relates in general to the field of security and, more particularly, to providing address protection in a virtual environment.

BACKGROUND

The field of network security has become increasingly important in today's society. In particular, the ability to effectively protect computers and systems presents a significant obstacle for component manufacturers, system designers, and network operators. This obstacle is made even more difficult due to the plethora of new security threats, which seem to evolve daily. Virtualization is a software technology allowing an operating system to run unmodified on an isolated virtual environment (typically referred to as a virtual machine), where a platform's physical characteristics and behaviors are reproduced. More specifically, a virtual machine can represent an isolated, virtual environment (lying on top of a host operating system (OS)) and equipped with virtual hardware (processor, memory, disks, network interfaces, etc.). Commonly, the virtual machine is managed by a virtualization product. A virtual machine monitor (VMM) is the virtualization software layer that manages hardware requests from a guest OS (e.g., simulating answers from real hardware). A hypervisor is computer software/hardware platform virtualization software that allows multiple operating systems to run on a host computer concurrently. Both Xen and Hypervisor represent forms of VMMs and these VMMs can be exploited to better protect computers and systems from emerging security threats.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example implementation includes identifying an address space in a memory element of a system configured to operate in a virtual environment. The address space includes at least one system address, and the address space is provided to a virtual machine monitor. The method also includes generating a page table entry for the system address in a shadow table stored in the virtual machine monitor in response to a guest operating system initiating a process. (Note that this is a functionality of a hypervisor and this information can be used for further processing). The page table entry is marked as a page not being present in order to trigger a page fault for a system address access from the guest operating system. In more specific embodiments, the method may include evaluating a page fault to determine access to the address space, where access from a writeable area of the memory element is denied.

Example Embodiments

Figure 1:
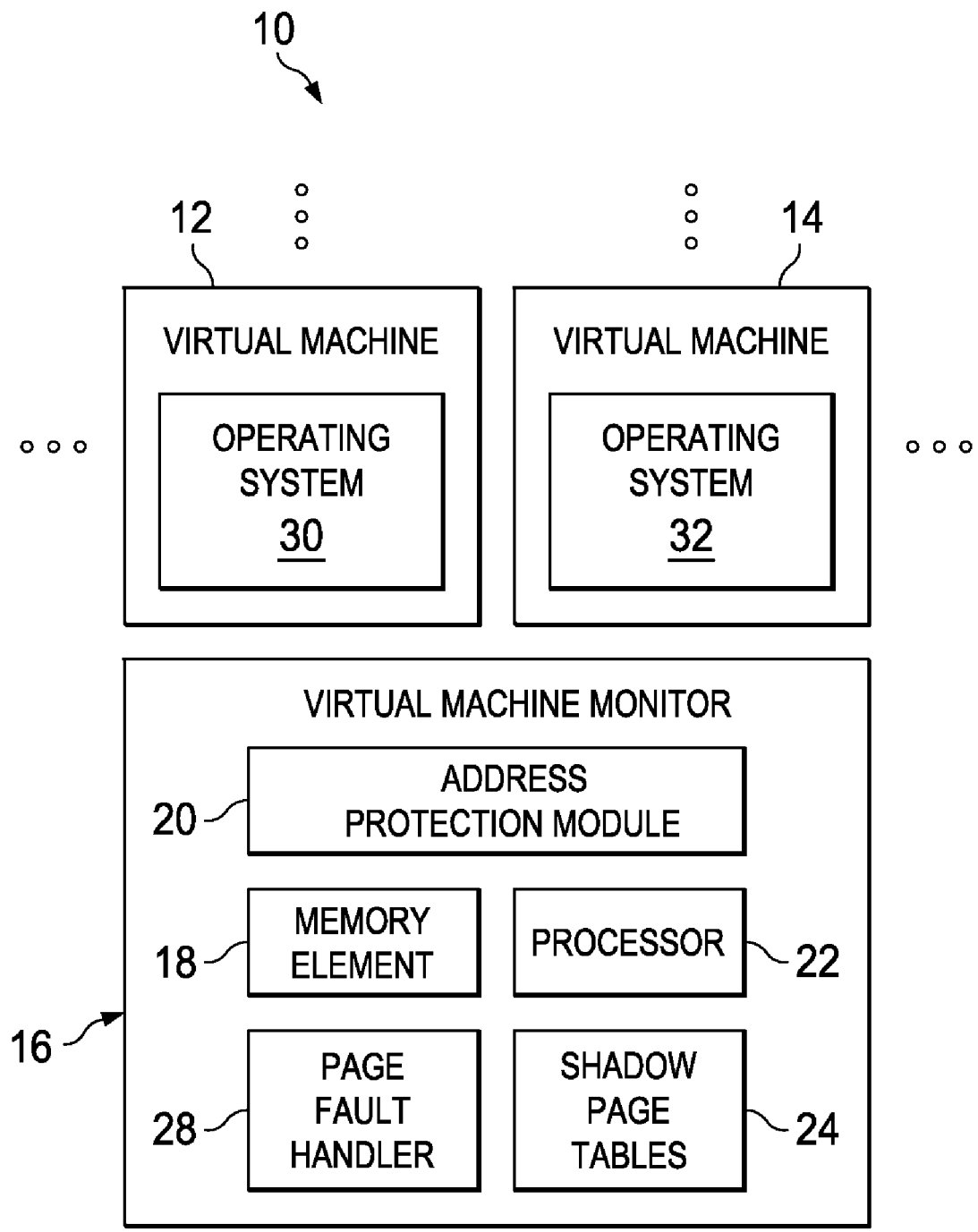
FIG. 1 is a simplified block diagram of a system for providing address protection in a virtual environment in accordance with one embodiment.

FIG. 1 is a simplified block diagram of a system 10 for providing address space protection in a virtual environment. System 10 may include a virtual machine 12 and a virtual machine 14, which have respective operating systems 30 and 32. System 10 may also include a virtual machine monitor 16 that includes an address protection module 20, a processor 22, a memory element 18, shadow page tables 24, and a page fault handler 28. In one example implementation, virtual machine monitor 16 is a hypervisor that runs on hardware, where multiple virtual machines run on top of the hypervisor. Not shown in FIG. 1 is additional hardware that may be suitably coupled to virtual machine monitor (VMM) 16 (e.g., provided below its logical representation) in the form of memory management units (MMU), symmetric multiprocessing (SMP) elements, physical memory, Ethernet, small computer system interface (SCSI)/integrated drive electronics (IDE) elements, etc.

In example embodiments, system 10 can move the address space protection mechanism from the operating system to a hypervisor. For purposes of illustrating the techniques of system 10, it is important to understand the activities occurring within a given virtual system. The following foundational information may be viewed as a basis from which the present disclosure may be properly explained. Such information is offered earnestly for purposes of explanation only and, accordingly, should not be construed in any way to limit the broad scope of the present disclosure and its potential applications.

In computer security, executable space protection can be used to mark memory regions as non-executable, such that an attempt to execute machine code in these regions will cause an exception. The approach can make use of hardware features such as the NX bit. If an operating system can mark some or all writeable regions of memory as non-executable, it may be able to prevent the stack and heap memory areas from being executable. This helps to prevent certain buffer overflow exploits from succeeding, particularly those that inject and execute code. These attacks rely on some part of memory, usually the stack, being both writeable and executable. When access to these areas is denied, the attack fails. For example, a networked host can attempt to exploit a server by taking advantage of memory space. One exploitation method uses a security hole to inject malicious code into the server memory and then executes the malicious code to comprise the server. This malicious code can search the data structures of an application, a library, or an operating system component to find and utilize server system resources for the purpose of interrupting these services (such as denial of service attacks), accessing sensitive information residing on the server, or performing other malicious steps.

Thus, malicious code can infect a computer system in a number of ways. In one type of attack, buffers used in networking are overflowed to inject malicious code. For example, web servers receiving service requests with data from untrusted hosts can be infected with malicious code embedded in the request and loaded by overflowing the web server's buffer. Data can be exchanged between a host and a web server using network communication protocols and mail protocols. A predominant characteristic of malicious code loaded by buffer overflows (or by other improper techniques) is that the code is loaded into (and executed from) memory that is writeable.

Flawed approaches to detecting such malicious code include special purpose hardware (e.g., a firewall) that inspects packets within a network data stream. A firewall can inspect a packet for unexpected binary data. When a packet inspection operation detects unexpected binary data (an indicator of potentially executable and malicious code), the firewall can isolate either the host making the service request or the stream of transmitted data. Other malicious software identification techniques check for patterns in files and data streams against known virus signatures. The limitation of this technique is that these signatures need to be kept current and are (inherently) out of date when a new virus is developed.

Turning to memory in a virtualized scenario, physical memory is managed by memory management units (MMUs). The MMU manages memory such that a process is prevented from altering the data or code of other processes. Further, the MMU can relate a process to an address space that is larger than the physical memory and this, generally, appears continuous. However, this continuous data/code virtual memory can be scattered in the physical memory, or swapped to a disk. In one method of managing physical memory, the MMU divides memory into blocks or pages that cover a continuous range of memory addresses. MMUs give each block or page attributes that identify whether the memory is read only (text memory) or read/write (data memory) or write only.

When an application, an operating system, or a library (including a dynamically linked library [dll]) is loaded into memory, the code segments are loaded into text or read only memory. Data memory is given the attribute that it is capable of being writeable. Data memory is allocated when a program is loaded or as the program executes. Malicious code loaded or injected into data or writeable memory can execute from a writeable memory space (in contrast to text memory). Detection of code running in a writeable memory space is an indication that the code is not under management of the operating system (OS) and, thus, is considered malicious or suspect code.

Providing malware protection to an OS in a virtualized environment has two potential problems. First, in a virtualized environment, an operating system runs above a layer of software: namely, the hypervisor. Malware protection mechanism should be developed and installed on each of the operating systems running in association with the hypervisor. This results in significant overhead in terms of memory and performance. Second, operating systems have inherent vulnerabilities, which make them susceptible to malware.

A protection mechanism outlined by FIG. 1 can be OS agnostic, which resolves many of these issues. In accordance with one example implementation, a critical address space protection mechanism is provided in virtual machine monitor 16 (e.g., in a hypervisor). Address space protection is a memory protection technique that affords protection against malware execution by controlling access to a critical operating system address (or area). While address space protection can be implemented inside the operating system, a hypervisor-based implementation can provide an OS agnostic solution. There is value to an end user in such a solution because security software does not need to be installed individually inside each virtual machine. Malware attacking the virtual machine is oblivious to this security layer running, for example, inside the hypervisor.

Generally, virtual machine monitors (e.g., Xen and HyperV) are hypervisors that can be employed to manage virtual machines and guest operating system (OS) instances. As used herein in this Specification, the term 'virtual machine monitor' is meant to include any such hypervisors, or other devices that can operate to manage one or more virtual machines and/or to protect an address space in a virtual environment, as detailed below.

Note that in computing, an executable (file) causes a computer to perform indicated tasks according to encoded instructions, as opposed to a file that only contains data. Files that contain instructions for an interpreter or virtual machine may be considered 'executables' or 'binaries' in contrast to program source code. The more generic term 'object' (as used herein in this Specification) is meant to include any such executables, malicious code that seeks to access an address space, viruses, worms, binaries, kernel modules, improper hypercalls, etc., which are sought to be invoked, initiated, or otherwise executed.

Turning to the infrastructure of FIG. 1, virtual machine monitor 16 can run multiple instances of guest OSs. Logically, this element can be thought of as the hypervisor in certain implementations. Virtual machine monitor 16 can be part of a server, a firewall, an antivirus solution, or more generically, a computer. An operating system usually segregates virtual memory into kernel space and user space. Kernel space is commonly reserved for running a kernel, the kernel extensions, and certain device drivers. In contrast, user space is the memory area where user mode applications work and this memory can be swapped out (if necessary).

Each user space process normally runs in its own virtual memory space and, unless explicitly requested, does not access the memory of other processes. This is the basis for memory protection in mainstream operating systems, and a building block for privilege separation. In another approach, a single address space for all software is used, where the programming language's virtual machine ensures that arbitrary memory cannot be accessed. Applications simply cannot acquire references to the objects that they are not allowed to access.

In one example implementation, virtual machine monitor 16 is a Xen element, which is a hypervisor that runs on bare hardware and which provides the capability of running multiple instances of OSs simultaneously on the same hardware. A typical Xen setup may involve Xen running beneath multiple OSs, where applications are on top of the OSs, which are associated with a group of virtual machines 12 and 14. The entire configuration may be provided in a server (or some other network appliance). One of the virtual machines 12 and 14 can be running an OS associated with Domain 0. This virtual machine (VM) Dom 0 provides the user with the interface to manage this complete setup, and also hosts the device drivers. This management includes the hypervisor configuration, VM configuration, creation, deletion, shutdown, startup, etc. of VMs. This kind of setup can be popular in data centers where servers run Xen, which in turn hosts multiple instances of guest OSs (i.e., VMs). Each such server can have one Domain 0. The features discussed herein can effectively secure this Domain 0, as detailed below.

In most virtualization scenarios, one of the virtual elements is referred to as Domain 0, and it has administrative authority to control other virtual machines. This domain represents a privileged area. In one example implementation, virtual machine monitor 16 is a Xen element configured to carry out some of the protection operations as outlined herein. Note that this Xen implementation is only representing one possible example to which the present disclosure can apply. Any number of additional hypervisors or virtual elements could similarly benefit from the broad teachings discussed herein.

In one example, a hypervisor can offer tools and applications necessary to support a complete virtualization environment. The hypervisor is the basic abstraction layer of software that sits directly on the hardware below operating systems. It is responsible for central processing unit (CPU) scheduling and memory partitioning of the various virtual machines running on a hardware device. The hypervisor not only abstracts the hardware for the virtual machines, but also controls the execution of virtual machines as they share the common processing environment.

Turning to some preliminary information associated with how memory systems are configured, a page table is the data structure used by a virtual memory system in a computer operating system to store the mapping between virtual addresses and physical addresses. Virtual addresses are those unique to the accessing process. Physical addresses are those unique to the CPU (e.g., random access memory (RAM)). In operating systems that use virtual memory, a process is given the impression that it is working with large, contiguous sections of memory. In reality, each process' memory may be dispersed across different areas of physical memory, or may have been paged out to a backup storage (typically the hard disk). When a process requests access to its memory, it is the responsibility of the operating system to map the virtual address provided by the process to the physical address where that memory is stored. The page table is where the operating system stores its mappings of virtual addresses to physical addresses.

The CPU's memory management tool (e.g., the MMU) can store a cache of recently used mappings from the operating system's page table. This is called the Translation Lookaside Buffer (TLB). When a virtual address needs to be translated into a physical address, the TLB is searched first. If a match is found (a TLB hit), the physical address is returned and the memory access can continue. However, if there is no match (called a TLB miss), the CPU can generate a processor interrupt called a page fault. The operating system has an interrupt handler to deal with such page faults. The handler will typically look up the address mapping in the page table to see whether a mapping exists. If one exists, it is written back to the TLB (this should be done, as the hardware accesses memory through the TLB in a virtual memory system), and the faulting instruction is restarted. This subsequent translation will find a TLB hit, and the memory access will continue.

Address space or process ID information is used so the virtual memory management system knows which pages to associate to specific processes. Two processes may use two identical virtual addresses for different purposes. The page table can supply different virtual memory mappings for the two processes. This can be done by assigning the two processes distinct address map identifiers, or by using process IDs. Associating process IDs with virtual memory pages can also aid in selection of pages to swap out, as pages associated with inactive processes, particularly processes whose main code page have been swapped out, are less likely to be needed immediately than pages belonging to active processes.

A hardware-assisted virtual machine (HVM) is a platform that enables efficient virtualization using help from hardware capabilities, primarily from the host processors. Full virtualization can be used to simulate a complete hardware environment, or virtual machine, in which an unmodified guest operating system (using the same instruction set as the host machine) executes in complete isolation.

Domain 0, a modified Linux kernel, is a unique virtual machine running on the hypervisor that has special rights to access physical I/O resources, as well as interact with the other virtual machines (Domain U: PV and HVM Guests) running on the system. Domain 0 is the first domain launched when the system is booted, and it can be used to create and configure all other regular guest domains. Domain 0 is also sometimes called Dom0 and, similarly, a regular guest domain is called a DomU or unprivileged domain. Virtualization environments can require Domain 0 to be running before other virtual machines can be started. Two drivers are generally included in Domain 0 to support network and local disk requests from Domain U PV and HVM Guests: the Network Backend Driver and the Block Backend Driver. The Network Backend Driver communicates directly with the local networking hardware to process all virtual machines requests coming from the Domain U guests. The Block Backend Driver communicates with the local storage disk to read and write data from the drive based upon Domain U requests.

Figure 2:
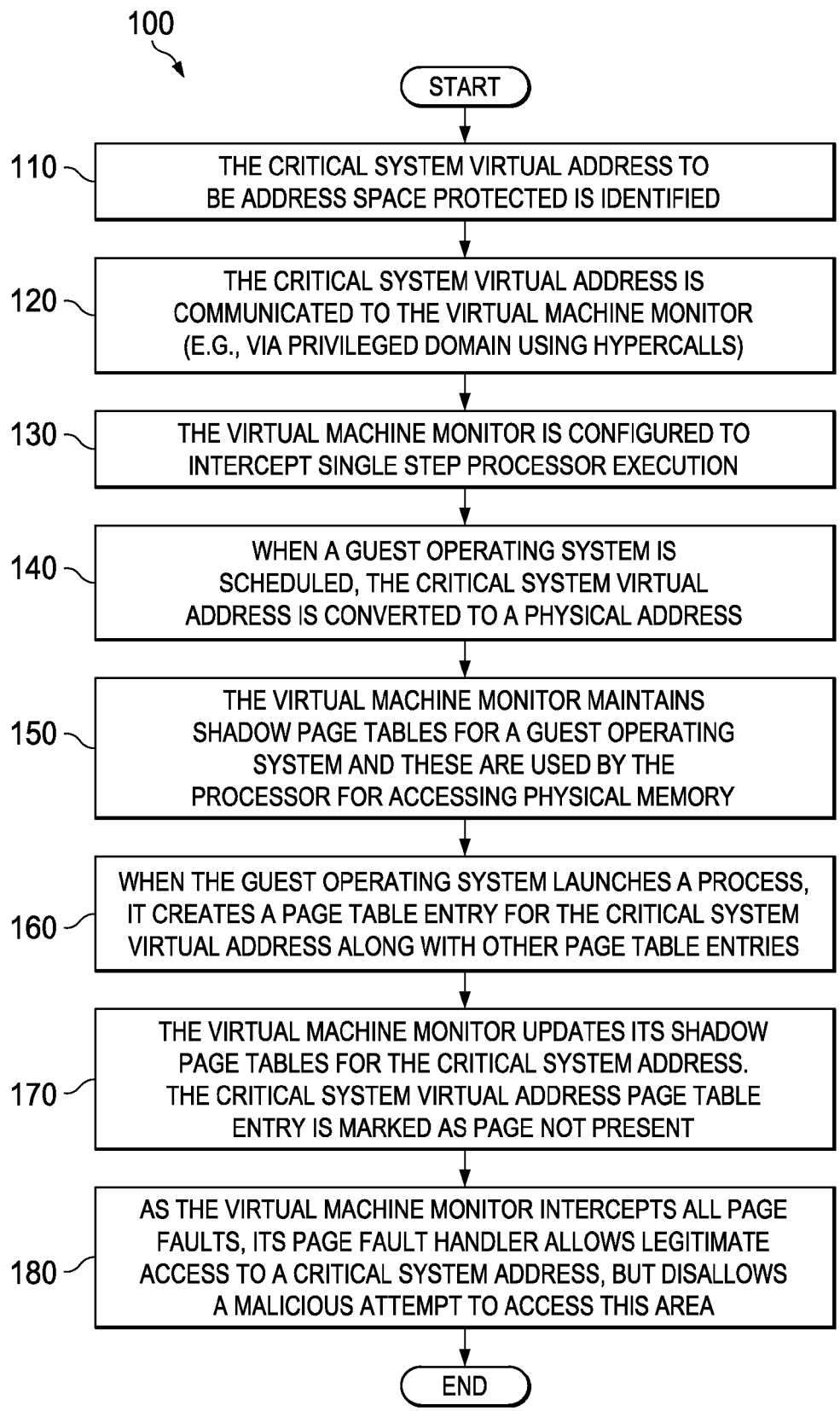
FIG. 2 is a simplified flowchart illustrating a series of example steps associated with the system in accordance with one embodiment.

Turning to FIG. 2, FIG. 2 is a simplified flowchart 100 illustrating a number of example steps associated with one implementation of system 10. The flow may begin at step 110, where the critical system virtual address(es) to be protected are identified. At step 120, this critical system virtual address is communicated to virtual machine monitor 16 (e.g., the hypervisor, via the privileged domain using hypercalls). At step 130, virtual machine monitor 16 is configured to intercept a SINGLE_STEP processor execution.

At step 140, when a guest OS is scheduled, the critical system virtual address is converted to a physical address (as understood by virtual machine monitor 16 and an associated processor). Step 150 illustrates how virtual machine monitor 16 (e.g., the hypervisor) maintains shadow page tables (e.g., within shadow page tables 24 of FIG. 1) for a guest OS. These can be used by the processor for accessing physical memory. At step 160, when the guest OS launches a process, it creates a page table entry (PTE) for the critical system virtual address, along with other PTE entries. At step 170, virtual machine monitor 16 (e.g., the hypervisor) updates its shadow page tables for the critical system address as well. Also at this point, a critical system virtual address page table entry (PTE) is marked as PAGE_NOT_PRESENT. This can trigger a page fault on a critical system address access from a guest OS, as its page table entry (PTE) is marked as PAGE_NOT_PRESENT.

Step 180 reflects that, as virtual machine monitor 16 (e.g., the hypervisor) intercepts page faults, its page fault handler 28 allows legitimate access to a critical system address, but disallows a malicious attempt to access this area. Virtual machine monitor 16 (e.g., the hypervisor) can achieve the above objective by: 1) fixing a page table entry (PTE) for a critical system address in its shadow page tables in case of access from a code area; and 2) disallowing access from a writeable area, which may indicate execution of malicious code.

In conjunction with these activities, virtual machine monitor 16 (e.g., the hypervisor) can mark a SINGLE_STEP flag for the processor. The processor can execute legitimate instructions trying to access a critical system address and trap back to the hypervisor. The hypervisor can mark the page table entry (PTE) for the critical system address as PAGE_NOT_PRESENT: again, to allow it to continue providing address space protection for future accesses to a critical system address.

Software for protecting address space (as well as inhibiting dangerous code from being executed) can be provided at various locations (e.g., within address protection module 20). In one example implementation, this software is resident in a computer sought to be protected from a security attack (or protected from unwanted, or unauthorized manipulations of a writeable memory area). In a more detailed configuration, this software is specifically resident in a security layer of a virtual machine monitor, which may include (or otherwise interface with) the components depicted by FIG. 1. In still other embodiments, software could be received or downloaded from a web server (e.g., in the context of purchasing individual end-user licenses for separate devices, separate virtual machines, hypervisors, servers, etc.) in order to provide this address space protection.

In other examples, the address space protection functions could involve a proprietary element (e.g., as part of an anti-virus solution), which could be provided in (or be proximate to) these identified elements, or be provided in any other device, server, network appliance, console, firewall, switch, information technology (IT) device, etc., or be provided as a complementary solution (e.g., in conjunction with a firewall), or provisioned somewhere in the network. As used herein in this Specification, the term 'computer' is meant to encompass these possible elements (VMMs, hypervisors, Xen devices, virtual devices, network appliances, routers, switches, gateway, processors, servers, loadbalancers, firewalls, or any other suitable device, component, element, or object) operable to affect or process electronic information in a security environment. Moreover, this computer may include any suitable hardware, software, components, modules, interfaces, or objects that facilitate the operations thereof. This may be inclusive of appropriate algorithms and communication protocols that allow for the effective protection of an address space. In addition, the address space protection functions can be consolidated in any suitable manner. Along similar design alternatives, any of the illustrated modules and components of FIGS. 1 and 3 may be combined in various possible configurations: all of which are clearly within the broad scope of this Specification.

In certain example implementations, the address space protection functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (as shown in the FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., a computer, a server, a network appliance, a firewall, a virtual machine monitor, any other type of virtual element, etc.) can include memory elements for storing information to be used in achieving the address space protection operations as outlined herein. Additionally, each of these devices may include a processor that can execute software or an algorithm to perform the address space protection activities as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., shadow page tables, etc.) should be construed as being encompassed within the broad term 'memory element.' Similarly, any of the potential processing elements, modules, and machines described in this Specification should be construed as being encompassed within the broad term 'processor.' Each of the computers, network appliances, virtual elements, etc. can also include suitable interfaces for receiving, transmitting, and/or otherwise communicating data or information in a secure environment.

Figure 3:
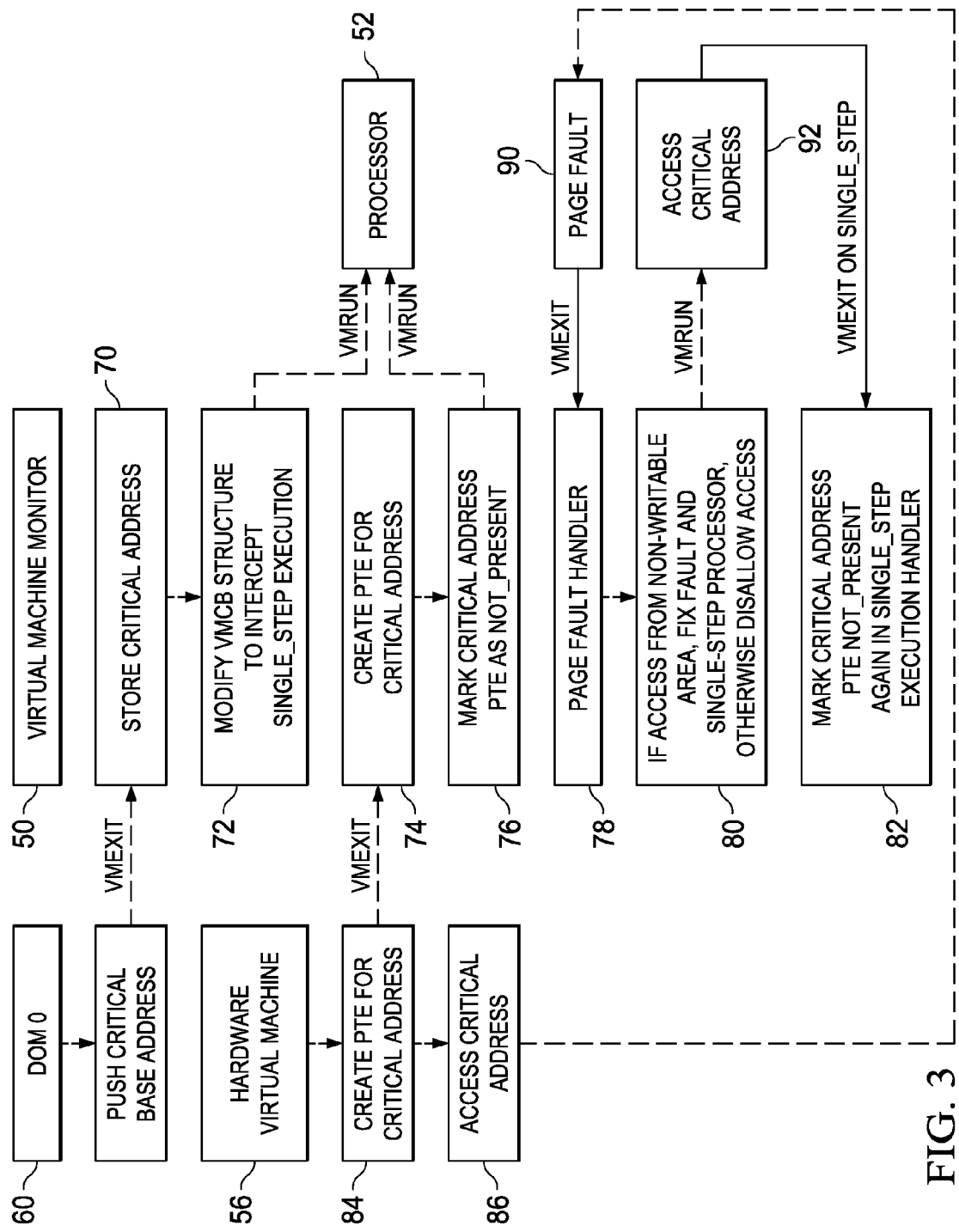
FIG. 3 is a simplified block diagram of a system for providing address protection in a virtual environment in accordance with another embodiment.

FIG. 3 is a simplified block diagram of one example implementation of the present disclosure. A number of operational steps are provided in this configuration in order to better guide the audience. In this example, FIG. 3 includes a virtual machine monitor 50, a processor 52, a page fault handler 78, and a Domain 0 60. Note that in this particular example of FIG. 3, control is being passed between virtual machine monitor 50 and virtual machines, as the address space protection solution operates. FIG. 3 represents a particular example involving a Kernel32.dll address.

Box 70 represents a critical address (to be protected) being stored in virtual machine monitor 50. The virtual machine control block (VMCB) structure may be modified in order to intercept a SINGLE_STEP execution, as shown in box 72. A page table entry is created for the critical address at box 74, where a hardware virtual machine (HVM) 56 (shown on the left hand side of FIG. 3) creates a page table entry for the critical address. This is depicted by box 84, which is followed by box 86 in which there is access to the critical address. Kernel32.dll is an example of a critical address to be protected.

The critical address page table entry is marked as NOT_PRESENT, at box 76. In addition, this operation is provided along with a virtual machine (VM) instruction (VMRUN) associated with processor 52. Page fault handler 78 is subsequently triggered, and this interfaces with a page default 90 (associated with the VMEXIT transition from a guest context to a hypervisor context). Note that page default 90 has a logical coupling to box 86 for access to the critical address. If access from a non-writeable area is present, a command is issued to fix the fault and put the processor into single step mode. If this is not the case, access is denied and this is reflected by box 80. Box 80 is associated with a VMRUN instruction issued to transfer control to a guest context to access a critical address, which is illustrated by box 92. Finally, virtual machine monitor 50 can mark the critical address page table entry NOT_PRESENT again in the SINGLE_STEP execution handler. This is depicted by block 82, which has a logical connection to a VMEXIT (transition from a guest context to a hypervisor context) on the SINGLE_STEP (leading back to box 92 for access to the critical address).

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that the systems of FIGS. 1 and 3 (and their teachings) are readily scalable. System 10 can accommodate a large number of components, as well as more complicated or sophisticated arrangements and configurations. Accordingly, the examples provided should not limit the scope or inhibit the broad teachings of system 10 as potentially applied to a myriad of other architectures. In addition, system 10 has been described herein as operating on particular Xen architectures; however, other systems can readily be accommodated by the present solution.

It is also important to note that the steps described with reference to the preceding FIGURES illustrate only some of the possible scenarios that may be executed by, or within, system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the discussed concepts.

What is claimed is:

1. A method, comprising:
identifying an address space in a memory element of a system configured to operate in a virtual environment, wherein the address space includes at least one critical address in user space memory to be protected from unauthorized access, and wherein the critical address is provided to a virtual machine monitor via a hypercall from a privileged domain that manages the virtual machine monitor, and wherein the virtual machine monitor is configured to intercept a single step execution by a processor;
generating a page table entry for the critical address in a shadow page table stored in the virtual machine monitor in response to a guest operating system initiating a process, wherein the page table entry is marked as a page not being present in order to trigger a page fault upon an attempt by the process to access the critical address from the guest operating system;
intercepting the page fault; and
evaluating the page fault to determine if the attempt to access the critical address is from a writable area of the memory element, wherein if the attempt to access is from a writable area of the memory element, the access is denied, such that an application executing the process can be prevented from executing.

2. The method of claim 1,
wherein if the attempt to access is from a non-writable area of the memory element, the access is allowed, the processor is put into a single step execution mode, and the page table entry is again marked as not present after the access is completed.

3. The method of claim 1, further comprising:
maintaining the shadow page table for one or more guest operating systems; and
updating the shadow page table as additional processes are initiated by the guest operating system.

4. The method of claim 1, wherein when the guest operating system initiates the process, the critical address is converted to a physical address.

5. The method of claim 1, further comprising:
intercepting a processor execution request from the guest operating system; and
using a page fault handler to permit or deny access to the critical address.

6. The method of claim 1, wherein a single step flag is marked in a processor flag for the processor to identify.

7. Logic encoded in one or more tangible non-transitory computer readable storage media that includes code for execution and when executed by a processor is operable to perform operations comprising:
identifying an address space in a memory element of a system configured to operate in a virtual environment, wherein the address space includes at least one critical address in user space memory to be protected from unauthorized access, and wherein the critical address is provided to a virtual machine monitor via a hypercall from a privileged domain that manages the virtual machine monitor, and wherein the virtual machine monitor is configured to intercept a single step execution by the processor;
generating a page table entry for the critical address in a shadow page table stored in the virtual machine monitor in response to a guest operating system initiating a process, wherein the page table entry is marked as a page not being present in order to trigger a page fault upon an attempt by the process to access the critical address from the guest operating system;
intercepting the page fault; and
evaluating the page fault to determine if the attempt to access the critical address is from a writable area of the memory element, wherein if the attempt to access is from a writable area of the memory element, the access is denied, such that an application executing the process can be prevented from executing.

8. The logic of claim 7,
wherein if the attempt to access is from a non-writable area of the memory element, the access is allowed, the processor is put into a single step execution mode, and the page table entry is again marked as not present after the access is completed.

9. The logic of claim 7, the processor being operable to perform operations comprising:
maintaining the shadow page table for one or more guest operating systems; and
updating the shadow page table as additional processes are initiated by the guest operating system.

10. The logic of claim 7, wherein when the guest operating system initiates the process, the critical address is converted to a physical address.

11. The logic of claim 7, wherein a single step flag is marked in a processor flag for the processor to identify.

12. The logic of claim 7, the processor being operable to perform operations comprising:
intercepting a processor execution request from the guest operating system; and
using a page fault handler to permit or deny access to the critical address.

13. An apparatus, comprising:
a virtual machine monitor;
a memory element configured to store data; and
a processor operable to execute instructions associated with the data, wherein the virtual machine monitor includes an address protection module configured to:
identify an address space in a memory element of a system configured to operate in a virtual environment, wherein the address space includes at least one critical address in user space memory to be protected from unauthorized access, and wherein the critical address is provided to the virtual machine monitor via a hypercall from a privileged domain that manages the virtual machine monitor, and wherein the virtual machine monitor is configured to intercept a single step execution by the processor;

generate a page table entry for the critical address in a shadow page table stored in the virtual machine monitor in response to a guest operating system initiating a process, wherein the page table entry is marked as a page not being present in order to trigger a page fault upon an attempt by the process to access the critical address from the guest operating system;

intercept the page fault; and evaluate the page fault to determine if the attempt to access the critical address is from a writable area of the memory element, wherein if the attempt to access is from a writable area of the memory element, the access is denied, such that an application executing the process can be prevented from executing.

14. The apparatus of claim 13, wherein if the attempt to access is from a non-writable area of the memory element, the access is allowed, the processor is put into a single step execution mode, and the page table entry is again marked as not present after the access is completed.

15. The apparatus of claim 13, wherein the virtual machine monitor is configured to:
maintain the shadow page table for one or more guest operating systems; and
update the shadow page table as additional processes are initiated by the guest operating system.

16. The apparatus of claim 13, wherein when the guest operating system initiates the process, the critical address is converted to a physical address.

17. The apparatus of claim 13, further comprising:
a page fault handler, wherein a processor execution request is intercepted from the guest operating system and the page fault handler is configured to permit or deny access to the critical address.

* * * * *